United States Patent

Jaffke

[15] 3,638,607
[45] Feb. 1, 1972

[54] RUBBER COATING APPARATUS WITH EXCESS RUBBER RECOVERY MECHANISM

[72] Inventor: Heinz K. E. Jaffke, Adapazari, Turkey

[73] Assignee: Uniroyal Endustri Turk, A.S., Adapazari, Turkey

[22] Filed: Aug. 8, 1969

[21] Appl. No.: 848,508

[52] U.S. Cl............................118/249, 118/261, 118/262
[51] Int. Cl.......................................................B05c 1/08
[58] Field of Search.............................118/249, 261, 262, 203

[56] References Cited

UNITED STATES PATENTS

| | | | |
|---|---|---|---|
| 1,558,271 | 10/1925 | Newell | 118/261 X |
| 2,239,383 | 4/1941 | Drewsen | 118/249 X |
| 2,676,563 | 4/1954 | Montgomery et al. | 118/249 X |
| 2,689,545 | 9/1954 | Nelson | 118/249 X |
| 2,789,530 | 4/1957 | Fleischauer | 118/262 X |
| 3,104,182 | 9/1963 | Schneider et al. | 118/261 X |

*Primary Examiner*—James Kee Chi
*Attorney*—Willard R. Sprowls

[57] ABSTRACT

In rubber-coating apparatus including calender rollers which define a coating gap therebetween for applying rubber to a fabric web, and in which excess rubber accumulates outside the lateral edges of the web, a new type of excess rubber recovery apparatus includes a pair of excess rubber control bodies, each having the shape of a solid of revolution. Each of these bodies is suspended by a flexible rotary drive shaft from a drive unit connected by a universal joint to a carriage which is adjustable along a horizontal rail. The mechanism rotates the control bodies in a manner to displace the excess rubber toward the central region of the fabric and permit it to be conveyed back to the coating gap by one of the calender rollers.

11 Claims, 1 Drawing Figure

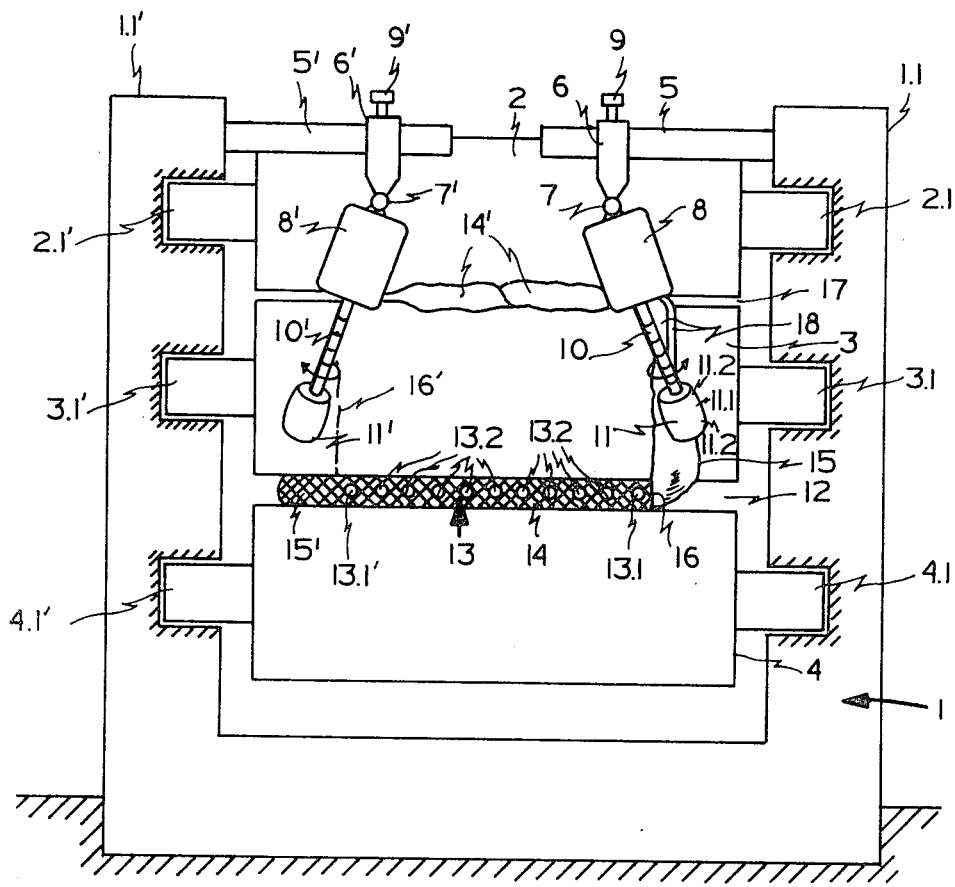

RUBBER COATING APPARATUS WITH EXCESS RUBBER RECOVERY MECHANISM

FIELD OF THE INVENTION

This invention relates generally to apparatus for rubber-coating fabrics, and is particularly concerned with means for recovering excess rubber escaping from the edges of the coated fabric.

THE PRIOR ART

Rubber-coated fabrics have a wide variety of uses. A notable example is the manufacture of pneumatic tires for automotive vehicles, in which it is common for layers of such rubberized fabric to be incorporated in the casing of the tire. In making rubberized fabrics for this and other purposes, uncoated cord fabric is fed through a coating gap defined between a pair of calendar rollers, and a hot, pliable rubber mixture is fed through the gap at the same time, to be pressed into intimate relationship with the fabric by the pressure of the calendar rollers.

A difficulty encountered with this process is that the pressure exerted upon the pliable rubber material squeezes it out in a lateral direction relative to the fabric web, forming lobes of excess rubber material which extend beyond the lateral edges of the fabric. This excess material is usually trimmed off and conveyed back over one of the calender rollers to be returned to the entrance of the coating gap. This permits the excess rubber ultimately to be used for coating fabric, instead of being discarded as waste.

Recovery of the excess rubber in this manner presents certain difficulties which the prior art has not been able to solve. The excess rubber lobes are quite thin and of a soft consistency, so that they are difficult to handle. Yet for recovery purposes, the lobes must be severed from the lateral edges of the fabric and gathered toward the central region of the fabric, i.e., the region between the lateral edges, so that they can be added to the centrally located mass of raw rubber material waiting to enter the coating gap. Moreover, handling of the excess rubber in this manner must be done immediately as it emerges from the coating gap.

Prior art approaches to the problem of excess rubber recovery have encountered a variety of difficulties. One such approach employs knife edges to sever the excess rubber material from the lateral edges of the fabric, in conjunction with a mechanism for winding up the excess and intermittently returning it to the rubber stock at the entrance of the coating gap. However, the use of knife edges to sever the excess has not been successful, primarily because the width of the fabric web is subject to some variation, resulting in a danger that the knife edge will occasionally slice into the moving fabric. Another problem is encountered by the mechanism for winding up excess material, since the velocity of the fabric web varies, which requires the winding speed to vary in a corresponding manner. This is difficult to accomplish because the tensile strength of the excess rubber material is low, and a simple capstan type of windup mechanism which is overdriven through a slip clutch would simply pull the rubber apart. Finally, any approach which returns the excess rubber material to the coating stock only at intervals runs the risk that the excess material will be unsuitable for return to the coating stock without first undergoing reprocessing.

Another prior art approach applies a rubber coating only to one side of the fabric web, and controls the width of the excess rubber material so that the lobe at each edge of the fabric has a width equal to about half the width of the web. Then these excess lobes are turned over and applied to the opposite side of the fabric. The disadvantages of this method are that it requires a relatively wide set of calender rollers to accommodate the larger lateral extent of the excess rubber lobes, plus the fact the method is applicable only to a process in which the web is coated successively on both sides.

Somewhat greater success has been achieved by severing the excess rubber material in close proximity to the calender rollers and taking advantage of the natural adhesiveness of the rubber material to convey it back over the surface of one of the rotating calender rollers for immediate redelivery to the entrance of the coating gap. With this approach, the outermost longitudinal cords of the fabric web can conveniently serve as cutting edges against which the excess rubber material is severed, but some form of stripping mechanism is required to cooperate with these cords in the severing operation. The close proximity of the stripping mechanism to the calender rollers presents the danger that the highly polished and vulnerable surfaces of these rollers will be damaged through contact. Even if one takes the precaution of forming the stripping mechanism of a softer material than the calender rollers, this danger is still present, because in prior art apparatus the stripping mechanism has a fixed position relative to the calender rollers. Other consequences which arise as a result of such a fixed position include wearing of the stripper mechanism, which necessitates intermittent adjustment and occasional replacement. Furthermore, any error in the positioning of the stripper mechanism allows a quantity of the excess rubber to escape recovery, and some of the lost material clogs the bearings of the calender rollers, which increases the cost of maintenance of this type of equipment. Moreover the percentage of rubber which is recovered is unsatisfactory, and the material not automatically recovered must be manually gathered at intervals, and reprocessed.

SUMMARY OF THE INVENTION

The present invention solves these problems by providing an excess rubber recovery mechanism comprising an excess rubber control body which has the shape of a solid of revolution relative to an axis, and means for rotating that body about its axis and mounting it in a position and attitude such that it contacts the excess rubber emanating from the edge of the fabric, and the rotation of the body displaces the excess toward the central region of the fabric. The rotating and mounting means preferably comprises a drive unit and a flexible drive shaft connected to the excess rubber control body. An additional feature of the invention involves the suspension of the drive unit from an overhead support member, which may be a horizontal rail along which the drive unit is adjustable to accommodate different fabric widths. In a preferred embodiment of the invention, the drive unit is connected to an adjustable joint which permits a range of adjustment of the attitude of the excess control body.

With this type of structure, the attitude and lateral position of the excess control body are readily adjustable to accommodate different widths of fabric. The flexibility of the drive shaft permits the excess control body to yield upon coming in contact with one of the calender rollers, thus providing a dynamically self-adjusting system which precludes damage to the vulnerable polished surfaces of the calender rollers. The rotational drive imparted to the excess rubber control body serves to strip the excess rubber material from the lateral edges of the fabric, as well as to gather it toward the central region of the fabric so that when it is conveyed back to the entrance of the coating gap by the calender rollers it arrives at a proper position for subsequent reuse as fabric coating stock.

Additional advantages of the invention are that all of the excess material is recovered, without loss of particles which might enter the bearings of the calender rollers, and it is no longer necessary to perform a special manual operation to collect unrecovered excess material.

BRIEF DESCRIPTION OF THE DRAWING

The single figure of the drawing is a front elevational view, partly diagrammatic in nature, of calender apparatus for rubber-coating fabric, which includes an excess rubber recovery mechanism in accordance with this invention.

DETAILED DESCRIPTION OF THE PREFERRED EMBODIMENT

The apparatus illustrated in the drawing includes a large stand 1 having a pair of upright posts 1.1 and 1.1' between which metal calender rollers 2, 3 and 4 are rotatably supported on respective shafts 2.1 and 2.1', 3.1 and 3.1', and 4.1 and 4.1'. Calender rollers 3 and 4 are used to apply unvulcanized rubber material to coat an elongated cord fabric web 13. This operation is accomplished within a coating gap 12 defined between the calender rollers 3 and 4. The fabric web 13 proceeds through the gap 12 in a forward direction (i.e., upwardly out of the plane of the drawing, toward the reader,) while the pressure of calender rollers 3 and 4 presses a mass of hot, pliable rubber-coating stock 14 into surrounding relationship with the cords of fabric 13 (including longitudinal cords 13.2 in the central region of the fabric and outermost cords 13.1 and 13.1' at the lateral edges thereof.) However, this pressure also has the effect of forcing the rubber material laterally out beyond the edges of the fabric (i.e., beyond cords 13.1 and 13.1') to form excess rubber lobes 15 and 15' respectively.

For the purposes of illustration, the excess material 15' at the left-hand side of the drawing is shown as though it had been severed at the point where it emerges from the coating gap 12, while the excess rubber material 15 appearing at the right-hand side of the drawing is shown as it actually appears during a fabric-coating process performed by the apparatus of this invention. Specifically, the excess material 15 at the right is torn upwardly from the fabric web 13 along a tear line designated 16 and, by virtue of the natural tendency of the rubber material 15 to adhere to the rotating calender roller 3, it is conveyed upwardly over calender roller 3 to join a mass of feeding rubber material 14'. The latter mass then passes through a gap 17 between calender rollers 2 and 3, and continues downwardly over the rear surface of rotating calender roller 3 until it returns to the entrance of the coating gap 12 at the rear side of the calender rollers 3 and 4. In this way the excess rubber material 15 is returned to the entrance of the gap 12 for reuse as fabric coating stock.

The excess rubber material 15 separates from the edge of the fabric 13, by its natural adhesion to the calender roller 3, and is conveyed toward the central region of the fabric 13 (i.e., intermediate the outermost cords 13.1 and 13.1',) by means of an excess rubber recovery mechanism for the right-hand edge of the fabric 13 which comprises a horizontal supporting rail 5 projecting from upright post 1.1 of the supporting stand 1, and a suspension carriage 6 which is adjustable horizontally along the rail 5, a drive unit 8 which is suspended from the carriage 6 by a universal joint 7, and an excess rubber-controlling body 11 which is rotatably driven by, and suspended from, the drive unit 8, by means of a drive shaft 10. A setscrew 9 releases the carriage 6 for horizontal adjustment along the rail 5, and then locks it in place relative to the rail after the desired adjustment has been achieved. The drive unit 8 is preferably a motor, for example a conventional electric motor, the speed of which can be controlled electrically from a remote location, together with a suitable reduction gear in the output train. Alternatively, the drive unit 8 may be a gear train or other rotary motion transmission which is driven by a remotely located motor unit through appropriate flexible couplings. The drive shaft 10 is preferably a flexible cable of conventional construction which suspends the body 11 in yieldable relationship to the calender roller 3 and is driven by unit 8 to rotate the excess rubber control body 11 in the angular direction indicated by the arrow nearby.

In operation, the carriage 6 is properly positioned horizontally along the rail 5, and the universal joint 7 is swiveled to the desired angle so that the excess rubber control body 11 is suspended in contact with the excess rubber lobe 15. By virtue of the adhesive relationship of the material 15 with the calender roller 3, the rotation of the calender roller carries the material 15 upwardly around the front surface of calender roller 3 and toward the gap 17 between calender rollers 2 and 3. In addition, the position of the carriage 6, and the angle of the universal joint 7, are selected so that the orientation of the excess rubber control body 11 is such that its rotational motion drives the excess rubber material 15 from the right-hand edge (cord 13.1) of the fabric 13 toward the central region thereof (fabric cords 13.2.) As a result, the excess rubber material 15 becomes folded over into narrow strands 18 which are shifted inboard of the fabric 13 and join the mass 14' centrally located at the entrance of the gap 17 between calender rollers 2 and 3. This mass 14' is then conveyed through the gap 17 to the rear of calender roller 3 (being flattened in the process) and passes downwardly across the rear of that calender roller to enter the gap 12 from the rear side thereof for fabric coating purposes.

The body 11 has the shape of a solid of revolution; that is to say it is substantially cylindrical, and its axis of cylindrical symmetry is coincident with the axis of drive shaft 10. However, the best results are obtained if the generally cylindrical shape of body 11 is modified by a slight crowning. Thus body 11 is slightly barrel shaped, with a somewhat larger diameter through its midsection 11.1 and a somewhat smaller diameter at opposite ends 11.2. This helps the body 11 to disengage from the rubber material more readily after forming it into folded strands 18.

Thus, the body 11, by virtue of its rotational movement and its position and attitude relative to the excess rubber material 15 and calender roller 3, serves under the rotation of the calender roller to convey the material around the calender roller into the feeding mass of rubber 14'. Moreover, the rotation of body 11 has the further effect of folding over the excess rubber material into controlled, compact strands 18, and conveying these strands toward the center of the apparatus so that the feeding mass 14' is centralized between the outermost fabric cords 13.1 and 13.1'. Consequently, as the feeding mass 14' passes through the gap 17 and around the rear surface of the calender roller 3, it is properly positioned so as to be usable for fabric-coating purposes.

The flexibility of the drive shaft 10 allows the excess rubber-controlling body 11 to yield when it comes in contact with the calender roller 3, a feature which prevents damage to the vulnerable, polished calender roller despite the close proximity which is necessary between the body 11 and the calender roller 3. In addition, the rubber-controlling body 11 is preferably fabricated of a nonmetallic material which is softer than the metal of the calender roller 3, for example wood, plastic or the like, so as to ensure further against scratching or other damage. The flexibility of the drive shaft 10 also permits the body 11 to accommodate itself to minor variations in the lateral width of the fabric 13.

At various times the speed with which material emerges from the coating gap 12 may vary in accordance with process requirements. Therefore, it is preferable if the speed of the drive unit 8 is controllable to match the velocity of rotation of the excess rubber-controlling body 11 to the speed of the excess rubber material 15. This is best accomplished by a remotely controlled electrical adjustment of the speed of the electric motor of drive unit 8.

The excess rubber material 15' which extends beyond the outermost fabric cord 13.1' at the left-hand edge of the fabric has been removed for clarity of illustration, but it will be appreciated that this excess material is also conveyed ever the calender roller 3 to form part of the feeding mass 14'. For this purpose, there is provided a duplicate excess rubber recovery mechanism at the left, comprising a horizontal railing 5', a suspension carriage 6', which is adjustable thereon and includes a setscrew 9' for locking purposes, a universal joint 7' which suspends a drive unit 8' from the carriage 6' and a flexible drive shaft 10' which yieldably suspends an excess rubber-controlling body 11' from the unit 8' and also drives it rotationally in the angular direction indicated by the arrow nearby. Under the influence of this mechanism, the excess rubber material 15' proceeding upwardly along a tear line 16', under the operation of this mechanism joins the feeding rubber mass 14' in the same manner described for the right-hand excess material 15. The two drive units 8 and 8' should preferably have a common speed control.

Thus it will be appreciated that this invention provides a novel excess rubber recovery mechanism for use in fabric-coating apparatus, which readily accommodates itself to different fabric widths and also dynamically adjusts to minor variations in those widths. The mechanism fully recovers all excess rubber material which appears outside the lateral edges of the fabric, conveys it toward a central location, so that it is conveyed back to the coating gap for reuse. The flexibility of the drive shafts and the material of which the excess rubber-controlling bodies are fabricated both militate against damage to the polished surfaces of the calender rollers, while the crowned shape of these bodies prevents them from becoming entangled in the recovered rubber material. The 100 percent rubber recovery achieved by this device avoids clogging the calender roller bearings, and also avoids any necessity for manual recovery of a portion of the excess rubber material.

While there has been described what is at present considered to be preferred embodiment of this invention, it will be obvious to those skilled in the art that various changes and modifications may be made therein without departing from the invention; and it is, therefore, intended to cover all such changes and modifications as fall within the true spirit and scope of the invention.

The embodiments of the invention in which an exclusive property or privilege is claimed, are defined as follows:

1. In rubber-coating apparatus including calender rollers which define a gap therebetween for applying a rubber coating to a fabric web which has opposite edges and a central region between said edges, and in which at least one of said rollers conveys excess rubber, which accumulates outside the opposite edges of said web, back to said gap; an excess rubber recovery mechanism comprising:
   at least one excess rubber control body having the shape of a solid of revolution about an axis;
   and means for rotating said excess rubber control body about said axis and for mounting said body in a position and attitude such that said body contacts excess rubber extending beyond one of said fabric edges and the rotation of said body displaces said excess rubber from said one edge of said fabric toward the central portion of said gap by conveying said excess rubber toward the center of the calender roller with which it is in contact.

2. Apparatus as in claim 1, wherein:
   said mounting means is flexible whereby to mount said excess rubber control body for yielding movement upon coming in contact with said calender roller with which said excess rubber is in contact.

3. Apparatus as in claim 1, wherein said rotating and flexible mounting means comprises:
   a flexible drive shaft connected for mounting and rotationally driving said excess rubber control body;
   and means for supporting and rotationally driving said drive shaft.

4. Apparatus as in claim 3, wherein:
   said supporting means is located above said fabric web;
   and said flexible drive shaft is arranged to suspend said body from said supporting means.

5. Apparatus as in claim 4 wherein:
   said supporting and driving means includes a drive unit connected to suspend and to rotationally drive said flexible drive shaft and a support mechanism mounting said drive unit above said fabric web, whereby said flexible drive shaft suspends said excess rubber control body from said drive unit.

6. Apparatus as in claim 5, wherein:
   said support mechanism comprises a substantially horizontal rail and a carriage adjustable horizontally along said rail whereby to accommodate different widths of fabric web;
   said drive unit being mounted on said carriage.

7. Apparatus as in claim 6, further comprising:
   means for releasably locking said carriage in a selected position along said rail.

8. Apparatus as in claim 6, wherein:
   said carriage comprises an adjustable joint connected to said drive unit and arranged for suspending said drive unit at any one of a range of angles.

9. Apparatus as in claim 1, wherein:
   said excess rubber control body has a crowned shape.

10. Apparatus as in claim 1, wherein:
    said excess rubber control body is formed of a nonmetallic material having a hardness substantially less than that of said calender roller with which said excess rubber is in contact.

11. Apparatus as in claim 1, wherein:
    said rotating means is adjustable as to the speed at which it rotates said excess rubber control body.

* * * * *